(12) United States Patent
Qi et al.

(10) Patent No.: US 12,250,514 B2
(45) Date of Patent: Mar. 11, 2025

(54) AUDIO SYSTEM FOR A VEHICLE

(71) Applicant: SAINT-GOBAIN GLASS FRANCE, Courbevoie (FR)

(72) Inventors: Shuibao Qi, Compiegne (FR); Antoine Lallement, Compiegne (FR); Adil Jaafar, Margny-les-Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 137 days.

(21) Appl. No.: 17/774,322

(22) PCT Filed: Nov. 2, 2020

(86) PCT No.: PCT/EP2020/080633
§ 371 (c)(1),
(2) Date: May 4, 2022

(87) PCT Pub. No.: WO2021/089457
PCT Pub. Date: May 14, 2021

(65) Prior Publication Data
US 2022/0394373 A1  Dec. 8, 2022

(30) Foreign Application Priority Data
Nov. 5, 2019 (FR) ........................ 1912416

(51) Int. Cl.
*H04R 1/26* (2006.01)
*B60R 11/00* (2006.01)
(Continued)

(52) U.S. Cl.
CPC ............ *H04R 1/26* (2013.01); *B60R 11/0217* (2013.01); *H04R 1/2811* (2013.01); *H04R 5/02* (2013.01);
(Continued)

(58) Field of Classification Search
CPC .......... H04R 1/26; H04R 1/2811; H04R 5/02; H04R 2499/13; B60R 11/0217;
(Continued)

(56) References Cited

U.S. PATENT DOCUMENTS 3,622,440 A * 11/1971 Snedeker .......... B32B 17/10788
156/334
7,853,025 B2 * 12/2010 Sleboda ................. H04R 7/045
181/161
(Continued)

FOREIGN PATENT DOCUMENTS

CN    208530246 U    2/2019
DE    101 64 509 A1   7/2003
(Continued)

OTHER PUBLICATIONS

Translation of FR3021268, Automotive vehicle Glass in Which a Speaker is Integrated Rilat et al. Nov. 27, 2015.*
(Continued)

*Primary Examiner* — Andrew Sniezek
(74) *Attorney, Agent, or Firm* — Pillsbury Winthrop Shaw Pittman LLP

(57) ABSTRACT

A roof of a vehicle includes a panel, and at least one audio device selected from the loudspeakers and the actuators, and when the at least one audio device is an actuator, it is located on the panel, the panel being capable of vibrating.

16 Claims, 3 Drawing Sheets

(51) Int. Cl.
*B60R 11/02* (2006.01)
*H04R 1/28* (2006.01)
*H04R 5/02* (2006.01)

(52) U.S. Cl.
CPC ............... *B60R 2011/0022* (2013.01); *B60R 2011/0026* (2013.01); *B60R 2011/0028* (2013.01); *H04R 2499/13* (2013.01)

(58) Field of Classification Search
CPC ..... B60R 2011/0022; B60R 2011/0026; B60R 2011/0028
See application file for complete search history.

(56) References Cited

U.S. PATENT DOCUMENTS

| | | | |
|---|---|---|---|
| 10,099,632 B1 | 10/2018 | Ortega Garcia et al. | |
| 10,160,399 B1* | 12/2018 | Scalisi | H04R 5/02 |
| 10,250,983 B1 | 4/2019 | Graham | |
| 2001/0012369 A1* | 8/2001 | Marquiss | H04R 5/02 |
| | | | 381/86 |
| 2009/0169031 A1 | 7/2009 | Iimori et al. | |
| 2015/0358727 A1* | 12/2015 | Rizzo | G10K 11/17857 |
| | | | 381/71.4 |
| 2018/0012589 A1 | 1/2018 | MacNeille et al. | |
| 2018/0090811 A1* | 3/2018 | Kagaya | H01Q 9/30 |

FOREIGN PATENT DOCUMENTS

| | | |
|---|---|---|
| FR | 3 021 268 A1 | 11/2015 |
| WO | WO 96/35313 A1 | 11/1996 |
| WO | WO 98/42536 A1 | 10/1998 |
| WO | WO 2009/061885 A1 | 5/2009 |

OTHER PUBLICATIONS

International Search Report as issued in International Patent Application No. PCT/EP2020/080633, dated Jan. 28, 2021.

Second Office Action as issued in Chinese Patent Application No. 202080005463.0, dated Apr. 19, 2024.

* cited by examiner

[Fig. 1]
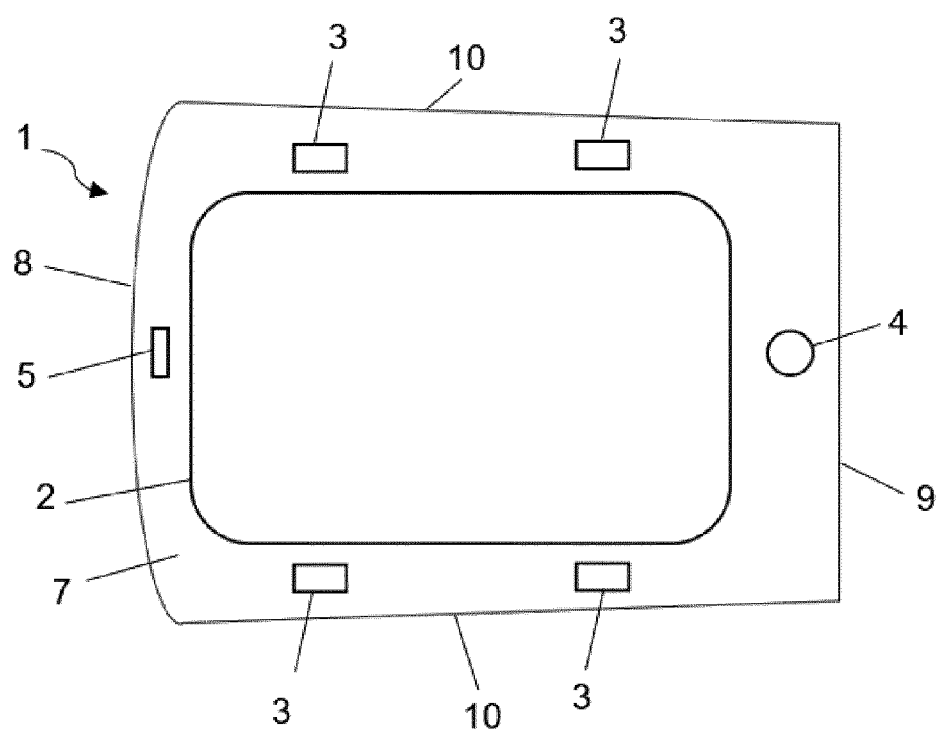

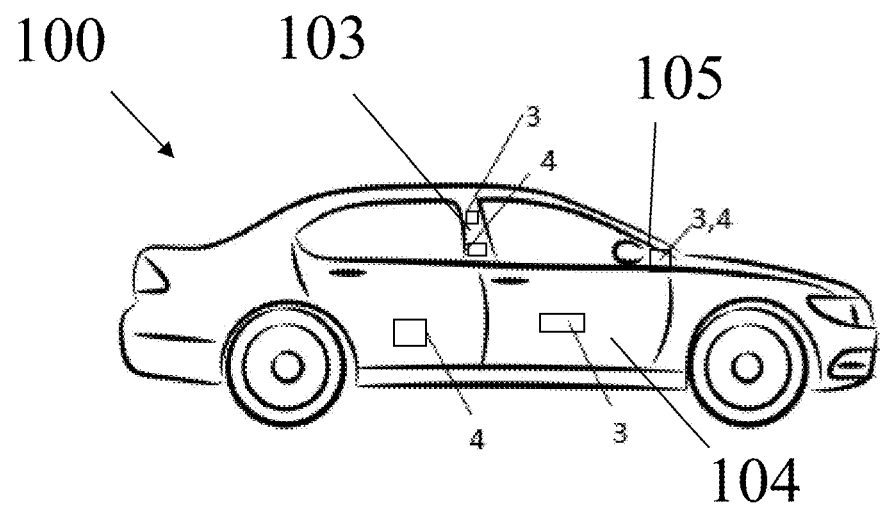
[Fig. 2]
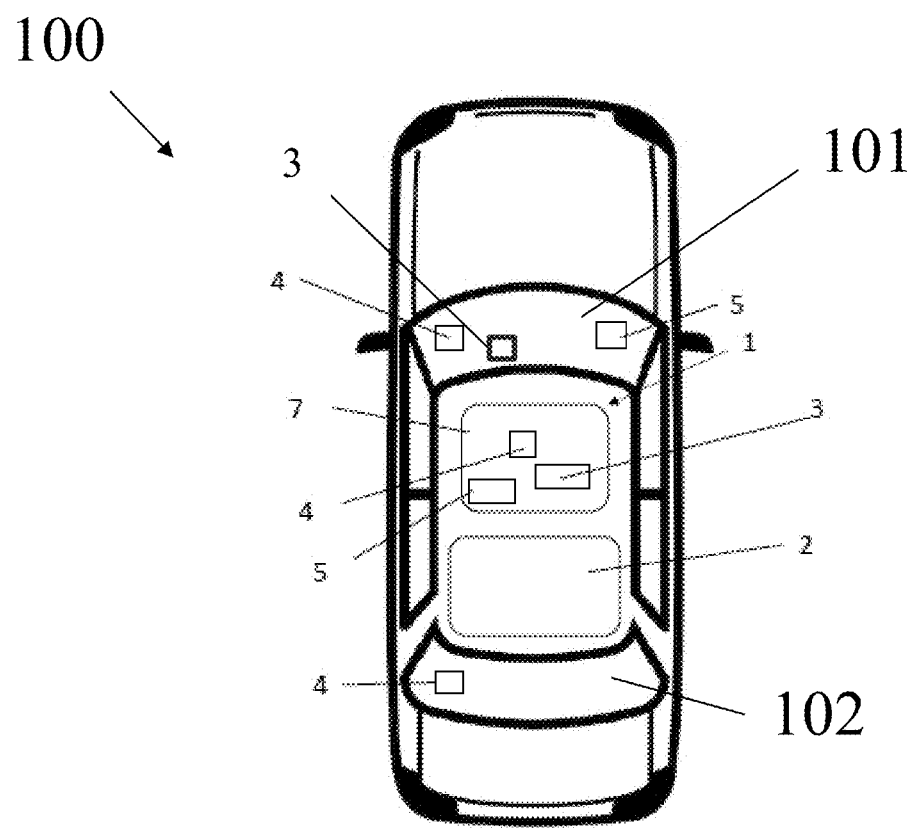
[Fig. 3]

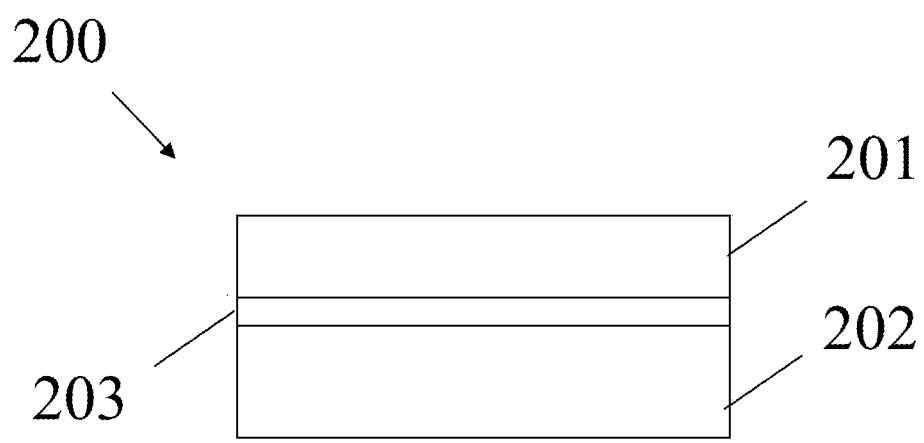
[Fig. 4]

AUDIO SYSTEM FOR A VEHICLE

CROSS-REFERENCE TO RELATED APPLICATIONS

This application is the U.S. National Stage of PCT/EP2020/080633, filed Nov. 2, 2020, which in turn claims priority to French patent application number 1912416 filed Nov. 5, 2019. The content of these applications are incorporated herein by reference in their entireties.

FIELD OF THE INVENTION

The present invention relates to a roof comprising a panel and one or more loudspeakers and/or actuators as well as to a vehicle comprising such a roof.

TECHNICAL BACKGROUND

Due to the growth of infotainment, audio systems have become an important part of vehicles today.

The loudspeakers that make up these audio systems are, in a large part of the vehicles, present in the doors and in the dashboard of the vehicle. However, this arrangement of the loudspeakers has several disadvantages. Indeed, due to the mobility of the doors, the loudspeakers must be integrated into the doors via rigid constructions that make it possible to reduce vibrations and stabilize the loudspeakers. These constructions take up a lot of space in the door and increase the weight of the door. In addition, the loudspeakers conventionally placed at the front of the vehicle are relatively far away from the passengers' ears, resulting in a loss of high-fidelity performance for the passengers. In particular, high frequencies are often poorly reproduced because they do not follow a direct path from the loudspeaker to the passengers' ears due to the presence of obstacles, such as the seats and other passengers, in the sound path. In addition, dashboard loudspeakers can lead to uneven sound distribution in the passenger compartment of the vehicle.

In addition, the size and weight of the doors are limited, preventing the incorporation therein of heavy or large-diaphragm loudspeakers, which can result in poor low-frequency reproduction. This disadvantage is overcome in conventional audio systems by incorporating an additional actuator, referred to as "subwoofer", positioned in the passenger compartment of the vehicle or in the trunk. This leads to a loss of space and an increase in the weight of the vehicle.

Finally, the conventional position of the loudspeakers in the doors or dashboard of the vehicle can reduce the performance of sound effects produced by computer software or hardware.

Different audio system solutions have been proposed.

Document U.S. Pat. No. 10,250,983 describes a vehicle audio system comprising a digital audio controller and at least two DSP/amplifier/loudspeaker modules positioned at different locations in the vehicle and connected to the controller via a single-wire cable.

US 2018/0012589 describes an audio system configured to create a plurality of zones in the passenger compartment of a vehicle and making it possible, via an interface, to control the sound and noise in one of these zones.

There is a need to provide an audio system for a vehicle that can be lighter, with excellent sound performance and low electricity consumption.

SUMMARY OF THE INVENTION

The invention relates firstly to a roof of a vehicle, in particular a motor vehicle, comprising:

a panel, and
at least one audio device selected from the loudspeakers and the actuators, and when the at least one audio device is an actuator, it is located on the panel, the panel being capable of vibrating.

In some embodiments, the at least one audio device is located on the panel, preferably in the peripheral zone of the panel.

In some embodiments, the at least one audio device is configured to generate high and/or medium frequencies.

In some embodiments, the roof comprises at least two audio devices selected from the loudspeakers and the actuators, preferably located on the panel, more preferably located in the peripheral zone of the panel, the at least two audio devices being preferably configured to generate high and/or medium frequencies.

In some embodiments, the roof further comprises at least one actuator configured to generate low frequencies, preferably located on the panel, more preferably located in the peripheral zone of the panel.

In some embodiments, the roof further comprises at least one loudspeaker or actuator configured to generate high frequencies, preferably located on the panel, more preferably located in the peripheral zone of the panel.

In some embodiments, the panel has a quadrilateral shape with a first edge, a second edge, a third edge and a fourth edge, which are consecutive, the roof comprising:

at least one, preferably at least two, audio devices selected from the loudspeakers and the actuators, preferably loudspeakers, positioned on the panel, in a peripheral zone adjacent to the first edge of the panel,
at least one, preferably at least two, audio devices selected from the loudspeakers and the actuators, preferably loudspeakers, positioned on the panel, in a peripheral zone adjacent to the third edge of the panel,
optionally an actuator configured to generate low frequencies positioned on the panel, in a peripheral zone adjacent to the second edge of the panel, and
optionally a loudspeaker or an actuator configured to generate high frequencies positioned on the panel, in a peripheral zone adjacent to the fourth edge of the panel.

In some embodiments, the panel is a glazing.

In some embodiments, the glazing comprises a glass sheet, preferably made of organic or mineral glass.

In some embodiments, the glazing comprises a laminated glass sheet comprising at least two glass sheets between which at least one interlayer film of viscoelastic plastic nature is inserted, the interlayer film of viscoelastic plastic nature preferably being made of polyvinyl butyral or ethylene-vinyl acetate copolymer, even more preferably of polyvinyl butyral, more preferably of acoustic polyvinyl butyral.

In some embodiments, the roof comprises a total number of loudspeakers and actuators (3, 4, 5) ranging from 1 to 20, preferably from 2 to 20, more preferably from 3 to 20, even more preferably from 6 to 15.

The invention also relates to a vehicle comprising a roof as defined herein before.

In some embodiments, the vehicle comprises a front windshield and/or a rear window and comprises at least one actuator configured to generate low frequencies positioned in the front windshield and/or in the rear window.

In some embodiments, the vehicle comprises a front windshield and comprises at least one loudspeaker or actuator configured to generate high frequencies positioned in the front windshield.

In some embodiments, the vehicle comprises at least one pillar, and comprises at least one audio device selected from the loudspeakers and the actuators located in the at least one pillar.

In some embodiments, the vehicle comprises at least one door and/or a dashboard and/or a front windshield and/or a rear window, and comprises at least one audio device selected from the loudspeakers and the actuators positioned in the at least one door and/or in the dashboard and/or in the front windshield and/or in the rear window.

In some embodiments, the vehicle is a motor vehicle.

The present invention makes it possible to meet the need expressed herein before. It provides more particularly a roof for a vehicle comprising an audio system having very good sound performance, which can also be light, compact and easily integrated in the roof of a vehicle. Furthermore, the audio system according to the invention also has one or preferably several of the following advantageous properties: it is compatible with other audio systems, it is discrete and aesthetic, it is flexible, it can be adapted to any type of vehicle, it can allow active noise control and the creation of sound effects.

This is accomplished by the presence of at least one audio device in the roof of the vehicle. This makes it possible to emit a sound high in the passenger compartment of the vehicle and close to the ears of the vehicle's passengers, thus ensuring a relatively short sound path, from the audio device to the passengers' ears, with few or no obstacles. This improves the intelligibility of sounds, such as audio messages or music, for the passengers. Moreover, since the audio device is attached to fixed parts of the vehicle, it avoids the need for heavy and cumbersome stabilizing structures. Furthermore, when the at least one audio device is an actuator, the presence of a panel in the roof enables this panel to vibrate in order to produce acoustic waves.

According to certain particular embodiments, the use of an actuator configured to generate low frequencies can make it possible, with respect to the use of a woofer loudspeaker, to improve the reproduction of low frequencies due to the use of a larger vibrating surface.

BRIEF DESCRIPTION OF THE FIGS.

FIG. 1 depicts a schematic view of a roof, viewed from below, of an example of a vehicle according to the invention.

FIG. 2 schematically shows a motor vehicle that is a motor vehicle.

FIG. 3 schematically shows a top view of the motor vehicle of FIG. 2.

FIG. 4 schematically shows a top view a laminated glass.

DETAILED DESCRIPTION

The invention is disclosed below in greater detail and in a non-limiting manner in the following disclosure.

The invention relates to a roof of a vehicle comprising a panel and at least one audio device (3) selected from the loudspeakers and the actuators. When the at least one audio device is one (or more) actuator(s), it (they) is (are) located on the panel, the panel being capable of vibrating.

"Audio device" is understood to mean a device capable of emitting sounds, for example music or voice. "Audio system" is understood to mean a system capable of emitting sounds.

"Panel" is understood to mean any surface that can be part of the roof.

Preferably, the panel is a glazing (the roof then contains a glazed part, or glazing, and is referred to as glazed roof in the present text). Alternatively or additionally, it can be another surface, for example a metal panel, such as a sheet-metal panel.

"Glazing" is understood to mean any element in the form of a plate and comprising at least one sheet (or layer) of glass. The glazing can be transparent or opaque, for example when the glass sheet is covered with an opaque coating. The opaque coating can be a paint or an enamel, for example, black-colored. The glazing according to the invention may comprise a transparent glazed part and an opaque glazed part, the opaque glazed part preferably surrounding the transparent glazed part.

"Quadrilateral shape" is understood to mean any element with four sides, straight or not, with angles that can be right, rounded or other.

The vehicle can be any type of vehicle comprising at least one passenger compartment delimited by a roof. Preferably, it is a motor vehicle for land transport, and more preferably, the vehicle is a motor vehicle (car). Alternatively, the vehicle can be a truck, van, bus or coach.

The roof can be any type of roof. It may be a fixed roof. "Fixed" is understood to mean fixed or intended to be fixed, with respect to the vehicle as a whole (with the understanding that the vehicle can move). Alternatively, the roof can be an opening roof, that is, comprising a fixed part and a mobile part making it possible to create an opening.

The roof, whether openable or not, contains a panel, which can be a glazed part (or a glazing). When the roof according to the invention is a glazed roof, it can also comprise a metal part, more preferably of sheet metal, preferably the metal part of the roof surrounds the glazing.

Preferably, in the case of an opening roof, the mobile part of the opening roof comprises or consists of the panel (for example the glazing).

Preferably, the surface of the panel (for example the glazing) represents at least 40%, or at least 50%, or at least 60%, or at least 70%, or at least 80%, or at least 90%, or at least 95%, or all, of the total surface of the roof.

Advantageously, the glazing comprises a glass sheet (or panel). The glass can be organic or mineral glass. More preferably, the glazing comprises or consists of laminated glass. "Laminated glass" is understood to mean at least two glass sheets between which at least one interlayer film, generally of viscoelastic plastic nature, is inserted. In the context of the invention, a laminated glass sheet (comprising two glass sheets and the interlayer film) will be considered as a single sheet and not as two. The interlayer film of plastic nature may comprise one or more layers, preferably one or two layers, of a viscoelastic polymer such as polyvinyl butyral (PVB) or an ethylene-vinyl acetate (EVA) copolymer, more preferably polyvinyl butyral. The interlayer film can be made of standard PVB or triple-layer acoustic PVB, preferably the interlayer film is made of acoustic PVB.

The use of a roof comprising a panel comprising laminated glass, with respect to a roof comprising a sheet-metal panel without glazing, makes it possible to form a more damped roof structure, which can facilitate the scattering of low frequencies and reduce the problems of vibration in the vehicle. Furthermore, the use, in the laminated glass, of an acoustic PVB, with respect to a standard PVB, makes it possible to further improve the reproduction of low frequencies and to reduce vibration problems.

The roof can also comprise a trim and/or a headliner.

The roof can have a quadrilateral shape, in particular rectangular or substantially rectangular (or trapezoidal or substantially trapezoidal). It is understood that the edges of such a roof are straight, or substantially straight, that is, they can be slightly curved, as shown in FIG. 1.

The panel (for example the glazing) of the roof preferably has a quadrilateral shape, in particular rectangular or substantially rectangular, or trapezoidal or substantially trapezoidal. The edges of such a panel (for example glazing) are straight or substantially straight (they can be slightly curved).

The edges of the roof and the edges of the panel can be aligned, partially or entirely, in particular when the panel represents the entire surface of the roof.

Audio Device Selected from the Loudspeakers and the Actuators Positioned in the Roof The roof according to the invention comprises at least one audio device selected from the loudspeakers and the actuators. The roof may comprise at least two audio devices selected from the loudspeakers and the actuators, or it may comprise at least 3, or at least 4, or at least 5, or at least 6, or at least 8, or at least 10, or at least 12, or at least 15 of these audio devices. The roof according to the invention can for example comprise 2 to 3, or 3 to 4, or 4 to 5, or 5 to 6, or 6 to 7, or 7 to 8, or 8 to 9, or 9 to 10, or 10 to 11, or 11 to 12, or 12 to 13, or 13 to 14, or 14 to 15, or 15 to 16, or 16 to 17, or 17 to 18, or 18 to 19 of these audio devices.

The loudspeakers according to the invention can be any loudspeaker capable of emitting sound waves. Each of these loudspeakers comprises a diaphragm. The diaphragm of the loudspeaker is preferably entirely in contact with the air. The diaphragm can be essentially planar. The diaphragm can for example be substantially rectangular or square. Alternatively, the diaphragm can for example be substantially disc-shaped or elliptical. The sound waves are produced by the diaphragm vibrating the ambient air (i.e., the air inside and outside the loudspeaker). The loudspeaker can be provided in the shape of a box, for example in the shape of a substantially straight block, one of the walls (e.g. faces) of which is the diaphragm or comprises an orifice wherein the diaphragm is located. The box can contain air, which is therefore air inside the loudspeaker.

Each loudspeaker can independently be a magnet loudspeaker, comprising a magnet and an electromagnetic coil in addition to the diaphragm. The magnet and the coil convert electrical energy into mechanical energy which is transmitted to the diaphragm. The diaphragm transmits the mechanical energy to the surrounding air, causing it to vibrate. Alternatively, the loudspeaker can be a piezoelectric loudspeaker. A piezoelectric loudspeaker comprises a ceramic or a piezoelectric polymer to which a radiating diaphragm is attached. The ceramic or polymer transforms electrical energy into mechanical energy (preferably proportionally), which is transmitted to the diaphragm. The diaphragm transmits the mechanical energy to the surrounding air, thus creating an acoustic wave.

The loudspeakers can comprise an insulator. This can reduce the sound radiation to the outside of the vehicle.

Preferably, the loudspeakers have a length of 30 to 200 mm, for example of 50 to 150 mm, and/or a width of 10 to 100 mm, for example of 20 to 60 mm. Alternatively, the loudspeakers can have a diameter of 10 to 150 mm, for example of 30 to 100 mm. The loudspeakers can have a depth of 10 to 50 mm, for example of 12 to 30 mm.

The diaphragm is preferably not covered with a trim or by another part of the roof.

Preferably, the diaphragm of the loudspeakers is substantially parallel to the roof, preferably to the panel (for example to the glazing).

In a particularly advantageous way, the loudspeakers are configured to generate high and/or medium frequencies.

"High frequencies" is understood to mean sound waves with a frequency higher than 2000 Hz.

"Medium frequencies" is understood to mean sound waves with a frequency ranging from 300 to 2000 Hz.

The actuators according to the invention can be any actuator transforming an electric current into mechanical energy making it possible to vibrate a surface, used as a diaphragm, to create an acoustic wave.

Loudspeakers have their own diaphragm; actuators do not have a diaphragm.

In the context of the invention, the actuators vibrate the roof panel. Preferably, the panel that the actuators vibrate comprises or consists of a glazing. The panel can also comprise or consist of an assembly consisting of a glazing and a metal part of the roof.

The actuators can have dimensions as disclosed herein before in relation to the loudspeakers.

When the one or more audio devices are or comprise one or more actuators, the latter are preferably configured to generate high and/or medium frequencies. Advantageously, these actuators comprise a signal filter for limiting the generated frequency band, for example, to high and/or medium frequencies. The signal filter can thus limit the emitted frequency band to a frequency range, this frequency range having a lower bound that is greater than or equal to 300 Hz. In other embodiments, the signal filter can limit the emitted frequency band to a frequency range having a lower bound that is greater than or equal to 150 Hz.

Preferably, the one or more audio devices (selected from the loudspeakers and the actuators) are (independently) located in a peripheral zone of the roof. "Peripheral zone of the roof" is understood to mean a part of the roof adjacent to the edges of the roof (that is, to the edges that delimit the roof). In some embodiments, the peripheral zone of the roof is the zone of the roof adjacent to the edges of the roof and with a width (that is, according to a direction orthogonal to the edge of the roof, in the plane of the roof) less than or equal to 50 cm, or less than or equal to 40 cm, or less than or equal to 30 cm, or less than or equal to 25 cm.

In particular, when the roof has a quadrilateral shape, with a first edge, a second edge, a third edge and a fourth edge, which are consecutive, the one or more audio devices can be located (independently) in a peripheral zone of the roof adjacent to the fourth edge (for example the front edge, that is, intended to be on the side of the front of the vehicle), for example in a zone of the roof adjacent to the fourth edge and with a width less than or equal to 50 cm, or less than or equal to 40 cm, or less than or equal to 30 cm, or less than or equal to 25 cm, and/or in a peripheral zone of the roof adjacent to the second edge (for example the rear edge, that is, intended to be on the side of the rear of the vehicle), for example in a zone of the roof adjacent to the second edge and with a width less than or equal to 50 cm, or less than or equal to 40 cm, or less than or equal to 30 cm, or less than or equal to 25 cm, and/or in a peripheral zone of the roof adjacent to the first and/or third edges (for example, one and/or the other of the lateral edges), for example in a zone of the roof adjacent to the first and/or third edges and with a width less than or equal to 50 cm, or less than or equal to 40 cm, or less than or equal to 30 cm, or less than or equal to 25 cm.

The one or more audio devices can be (independently) located in a peripheral zone adjacent to an edge of the roof in the vicinity of a corner of the roof, for example in a zone with a length (that is, according to a direction parallel to said edge of the roof, in the plane of the roof), less than or equal to one third of said edge of the roof (this length being measured from said corner).

In a particularly advantageous way, the roof comprises at least two audio devices selected from the loudspeakers and the actuators and, when the roof has a quadrilateral shape, at least one audio device is located in a peripheral zone adjacent to a first edge of the roof (for example in a zone of the roof adjacent to a first edge and with a width less than or equal to 50 cm, or less than or equal to 40 cm, or less than or equal to 30 cm, or less than or equal to 25 cm) and at least one other audio device is located in a peripheral zone of the roof adjacent to a second edge of the roof that faces the first edge (for example in a zone of the roof adjacent to a second edge and with a width less than or equal to 50 cm, or less than or equal to 40 cm, or less than or equal to 30 cm, or less than or equal to 25 cm). Edges that face one another is understood to mean edges that are not consecutive to one another; preferably, edges that face one another are parallel or substantially parallel.

The audio device is advantageously located on the panel (for example the glazing). When the roof comprises several of these audio devices, all or only some of them can be located on the panel (for example the glazing).

The one or more audio devices can be (independently) located on the panel, in a peripheral zone of the panel (this peripheral zone being understood to be part of the panel). "Peripheral zone of the panel" is understood to mean a part of the panel (for example the glazing) adjacent to the edges of the panel (for example the glazing). It may mean the zone of the panel (for example the glazing) adjacent to the edges of the panel (for example the glazing) and with a width (that is, according to a direction orthogonal to the edge of the panel (for example of the glazing), in the plane of the panel (for example of the glazing)) less than or equal to 50 cm, or less than or equal to 40 cm, or less than or equal to 30 cm, or less than or equal to 25 cm.

When the panel (for example the glazing) has a quadrilateral shape, with a first edge, a second edge, a third edge and a fourth edge, which are consecutive, the one or more audio devices can be (independently) located in the panel (for example the glazing) in a peripheral zone of the panel (for example of the glazing) adjacent to the fourth edge (for example the front edge, that is, intended to be on the side of the front of the vehicle), for example in a zone of the panel (for example of the glazing) adjacent to the fourth edge and with a width less than or equal to 50 cm, or less than or equal to 40 cm, or less than or equal to 30 cm, or less than or equal to 25 cm, and/or in a peripheral zone of the panel (for example of the glazing) adjacent to the second edge (for example the rear edge, that is, intended to be on the side of the rear of the vehicle), for example in a zone of the panel (for example of the glazing) adjacent to the second edge and with a width less than or equal to 50 cm, or less than or equal to 40 cm, or less than or equal to 30 cm, or less than or equal to 25 cm, and/or in a peripheral zone of the panel (for example of the glazing) adjacent to the first and/or third edges (for example, one and/or the other of the lateral edges), for example in a zone of the panel (for example of the glazing) adjacent to the first and/or third edges and with a width less than or equal to 50 cm, or less than or equal to 40 cm, or less than or equal to 30 cm, or less than or equal to 25 cm.

The one or more audio devices can be (independently) located in the panel (for example the glazing), in a peripheral zone adjacent to an edge of the panel (for example of the glazing) in the vicinity of a corner of the panel (for example of the glazing), for example in a zone with a length (that is, in a direction parallel to said edge of the glazing, in the plane of the glazing), less than or equal to one third of said edge of the panel (for example of the glazing) (this length being measured from said corner).

In a particularly advantageous way, the roof comprises at least two audio devices selected from the loudspeakers and the actuators located on the panel (for example the glazing) and, when the panel (for example the glazing) has a quadrilateral shape, at least one audio device is located in the panel (for example the glazing), in a peripheral zone adjacent to a first edge of the panel (for example of the glazing) (for example in a zone of the panel (for example of the glazing) adjacent to a first edge and with a width less than or equal to 50 cm, or less than or equal to 40 cm, or less than or equal to 30 cm, or less than or equal to 25 cm) and at least one other audio device is located in the panel (for example the glazing) in a peripheral zone of the panel (for example of the glazing) adjacent to a second edge of the panel (for example of the glazing) that faces the first edge (for example in a zone of the panel (for example of the glazing) adjacent to a second edge and with a width less than or equal to 50 cm, or less than or equal to 40 cm, or less than or equal to 30 cm, or less than or equal to 25 cm).

The audio device is a loudspeaker or an actuator. When the roof comprises several (at least two) of these audio devices, they are advantageously loudspeakers. Alternatively, they can be actuators. In a third variant, they can consist of one or more loudspeakers and one or more actuators. The use of loudspeakers, compared with the use of actuators, can make it possible to limit sound radiation to the outside of the vehicle.

Actuator Configured to Generate Low Frequencies

The roof according to the invention may comprise at least one actuator configured to generate low frequencies. In the context of the present invention, this actuator configured to generate low frequencies is an additional audio device, different from the at least one audio device selected from the loudspeakers and the actuators as disclosed herein before.

"Low frequencies" is understood to mean sound waves with a frequency lower than 300 Hz.

The presence of such an actuator can make it possible to avoid the use of an additional subwoofer and the shortcomings, in terms of additional weight and bulk, associated with same.

This actuator can be like the actuators disclosed herein before (in relation to the at least one audio device selected from the loudspeakers and the actuators), with the condition that it is configured to generate low frequencies.

In a preferred way, the actuator configured to generate low frequencies is located in a peripheral zone of the roof. The peripheral zone can be as disclosed herein before. When the roof has a quadrilateral shape, with a first edge, a second edge, a third edge and a fourth edge, which are consecutive, the actuator can be located in a peripheral zone of the roof adjacent to the fourth edge (for example the front edge) and/or in a peripheral zone of the roof adjacent to the second edge (for example the rear edge) and/or in a peripheral zone of the roof adjacent to the first and/or third edge (for example to one and/or the other of the lateral edges). These peripheral zones can be as disclosed herein before.

The surface that the actuator configured to generate low frequencies vibrates may comprise or consist of a glazing. The surface can also comprise or consist of an assembly consisting of a glazing and a metal part of the roof. Preferably, the surface that the actuator configured to generate low frequencies vibrates is the panel of the roof.

Advantageously, the actuator configured to generate low frequencies is located on the panel (for example the glazing), preferably in a peripheral zone of the panel (for example of the glazing). The peripheral zone of the panel (for example of the glazing) can be as disclosed herein before. When the panel (for example the glazing) of the roof has a quadrilateral shape, with a first edge, a second edge, a third edge and a fourth edge, which are consecutive, the actuator can be located in a peripheral zone of the panel (for example of the glazing) adjacent to the fourth edge (for example the front edge) and/or in a peripheral zone of the panel (for example of the glazing) adjacent to the second edge (for example the rear edge) and/or in a peripheral zone of the panel (for example of the glazing) adjacent to the first and/or third edge (for example to one and/or the other of the lateral edges). These peripheral zones can be as disclosed herein before.

The location of the actuator configured to generate low frequencies in the roof, and in particular on the panel (for example the glazing) makes it possible to improve the emission of the low frequencies since, at this location, a relatively large surface (for example the glazing of the roof or the assembly of the glazing/metal part of the roof) can be available to vibrate (that is, available as diaphragm) in order to generate low frequencies.

The at least one actuator configured to generate low frequencies may comprise a signal filter. The signal filter makes it possible to limit the emitted frequency band to the low frequencies. The signal filter can thus limit the emitted frequency band to a frequency range, this frequency range having an upper bound that is less than or equal to 300 Hz.

Typically, when using the roof in a vehicle, the actuator may in certain cases create vibratory phenomena in the vehicle, resulting for example in the vibration of the rear-view mirror. This vibratory phenomenon generally has a localized frequency. The actuator according to the present invention may comprise a signal filter making it possible to limit the frequency of the signal broadcast by the actuator and to cancel out the frequencies that are responsible for this vibratory phenomenon. Preferably, the signal filter can perform low-frequency band-stop filtering.

Preferably, the roof comprises a single actuator configured to generate low frequencies.

Loudspeaker or Actuator Configured to Generate Low Frequencies

The roof according to the invention can also comprise at least one loudspeaker or actuator configured to generate high frequencies. This loudspeaker or actuator is also referred to as "tweeter". In the context of the present invention, this loudspeaker or actuator configured to generate high frequencies is an additional audio device, different from the at least one audio device selected from the loudspeakers and the actuators as disclosed herein before.

This tweeter can be like the loudspeakers or actuators disclosed herein before (in relation to the at least one audio device selected from the loudspeakers and the actuators), with the condition that it is configured to generate high frequencies.

The tweeter may comprise a signal filter. The signal filter makes it possible to limit the emitted frequency band to the high frequencies (that is, to limit the emitted frequency band to a frequency range, this frequency range having a lower bound that is greater than or equal to 2000 Hz).

In a preferred way, the at least one tweeter is located in a peripheral zone of the roof. The peripheral zone can be as disclosed herein before. When the roof has a quadrilateral shape, with a first edge, a second edge, a third edge and a fourth edge, which are consecutive, the actuator can be located in a peripheral zone of the roof adjacent to the fourth edge (for example the front edge) and/or in a peripheral zone of the roof adjacent to the second edge (for example the rear edge) and/or in a peripheral zone of the roof adjacent to the first and/or third edge (for example to one and/or the other of the lateral edges). These peripheral zones can be as disclosed herein before.

In a particularly advantageous way, the at least one tweeter is located on the panel (for example the glazing), preferably in a peripheral zone of the panel (for example of the glazing). The peripheral zone of the panel (for example of the glazing) can be as disclosed herein before. When the panel (for example the glazing) of the roof has a quadrilateral shape, with a first edge, a second edge, a third edge and a fourth edge, which are consecutive, the tweeter can be located in a peripheral zone of the panel (for example of the glazing) adjacent to the fourth edge (for example the front edge) and/or in a peripheral zone of the panel (for example of the glazing) adjacent to the second edge (for example the rear edge) and/or in a peripheral zone of the panel (for example of the glazing) adjacent to the first and/or third edge (for example to one and/or the other of the lateral edges). These peripheral zones can be as disclosed herein before.

In a preferred way, the tweeter is a loudspeaker.

Preferably, the roof comprises at least two tweeters. In a less preferred way, the roof may comprise a single tweeter.

Preferably, when the roof comprises at least one actuator configured to generate low frequencies and at least one tweeter, and when the roof has a quadrilateral shape, the at least one actuator configured to generate low frequencies is located in a peripheral zone adjacent to a first edge of the roof (for example in a zone of the roof adjacent to a first edge and with a width less than or equal to 50 cm, or less than or equal to 40 cm, or less than or equal to 30 cm, or less than or equal to 25 cm) and the at least one tweeter is located in a peripheral zone of the roof adjacent to a second edge of the roof that faces the first edge (for example in a zone of the roof adjacent to a second edge and with a width less than or equal to 50 cm, or less than or equal to 40 cm, or less than or equal to 30 cm, or less than or equal to 25 cm).

In an even more preferred way, when the roof comprises at least one actuator configured to generate low frequencies and at least one tweeter located on the panel (for example the glazing), and when the panel (for example the glazing) has a quadrilateral shape, the at least one actuator configured to generate low frequencies is located in a peripheral zone adjacent to a first edge of the panel (for example of the glazing) (for example in a zone to of the panel (for example of the glazing) adjacent to a first edge and with a width less than or equal to 50 cm, or less than or equal to 40 cm, or less than or equal to 30 cm, or less than or equal to 25 cm) and the at least one tweeter is located in a peripheral zone of the panel (for example of the glazing) adjacent to a second edge of the glazing that faces the first edge (for example in a zone of the panel (for example of the glazing) adjacent to a second edge and with a width less than or equal to 50 cm, or less than or equal to 40 cm, or less than or equal to 30 cm, or less than or equal to 25 cm).

Total Audio Elements of the Roof

In some embodiments, the roof comprises a total number of loudspeakers and/or actuators ranging from 1 to 20, preferably from 2 to 20, more preferably from 3 to 20, even more preferably from 6 to 15. For example, the total number of loudspeakers and/or actuators of the roof can be 1 to 2, or 2 to 3, or 3 to 4, or 4 to 5, or 5 to 6, or 6 to 7, or 7 to 8, or 8 to 9, or 9 to 10, or 10 to 11, or 11 to 12, or 12 to 13, or 13 to 14, or 14 to 15, or 15 to 16, or 16 to 17, or 17 to 18, or 18 to 19, or 19 to 20.

The total number of loudspeakers and/or actuators on the panel (for example the glazing) can be from 1 to 20, preferably from 2 to 20, more preferably from 3 to 20, even more preferably from 6 to 15. For example, the total number of loudspeakers and/or actuators on the glazing can be 1 to 2, or 2 to 3, or 3 to 4, or 4 to 5, or 5 to 6, or 6 to 7, or 7 to 8, or 8 to 9, or 9 to 10, or 10 to 11, or 11 to 12, or 12 to 13, or 13 to 14, or 14 to 15, or 15 to 16, or 16 to 17, or 17 to 18, or 18 to 19, or 19 to 20.

According to some embodiments, when the roof has a quadrilateral shape, with a first edge, a second edge, a third edge and a fourth edge, which are consecutive, the roof comprises:
- at least one, preferably at least two, audio devices selected from the loudspeakers and the actuators, preferably loudspeakers, positioned in a peripheral zone adjacent to the first edge of the roof (for example a lateral edge),
- at least one, preferably at least two, audio devices selected from the loudspeakers and the actuators, preferably loudspeakers, positioned in a peripheral zone adjacent to the third edge of the roof (for example the other lateral edge),
- optionally an actuator configured to generate low frequencies positioned in a peripheral zone adjacent to the second edge of the roof (for example the rear edge), and
- optionally a tweeter positioned in a peripheral zone adjacent to the fourth edge of the roof (for example the front edge).

In a particularly advantageous way, when the panel (for example the glazing) has a quadrilateral shape, with a first edge, a second edge, a third edge and a fourth edge, which are consecutive, the roof may comprise:
- at least one, preferably at least two, audio devices selected from the loudspeakers and the actuators, preferably loudspeakers, positioned on the panel (for example the glazing), in a peripheral zone adjacent to the first edge of the panel (for example of the glazing),
- at least one, preferably at least two, audio devices selected from the loudspeakers and the actuators, preferably loudspeakers, positioned on the panel (for example the glazing), in a peripheral zone adjacent to the third edge of the panel (for example of the glazing),
- optionally an actuator configured to generate low frequencies positioned on the panel (for example the glazing), in a peripheral zone adjacent to the second edge of the panel (for example of the glazing), and
- optionally a tweeter positioned on the panel (for example the glazing), in a peripheral zone adjacent to the fourth edge of the panel (for example of the glazing).

The loudspeakers and/or actuators of the audio system (in particular the at least one audio device selected from the loudspeakers and the actuators, the optional at least one actuator configured to generate low frequencies, and the optional at least one tweeter) can be attached independently from one another to the roof (and in particular on the panel (for example the glazing)) by any attachment means. The attachment means can be rigid or more flexible. Attachment means that can be used according to the invention are glue, adhesive tape, in particular double-sided adhesive tape, or a combination thereof. Alternatively, or additionally, the loudspeakers and/or actuators can be attached by supports means, for example plastic parts, attached in the roof (for example attached on the panel (for example the glazing) of the vehicle) in which the loudspeakers and/or actuators are snap-fit or the loudspeakers and/or actuators can be encapsulated in a support, for example a plastic part, the assembly of the loudspeakers and/or actuators/support being removable with respect to the rest of the roof. These latter embodiments have the advantage that the loudspeaker and/or the actuator is removable with respect to the roof and can be easily removed and changed, for example in case of failure.

The power wires and other audio elements associated with the loudspeakers and actuators of the roof can be arranged inside the trim of the roof or in the headliner under the roof, for example so as to be hidden and non-visible.

The following embodiment illustrates the invention in a non-limiting manner.

In reference to FIG. 1, a roof 1 of a vehicle comprises several audio devices (3, 4, 5). In this embodiment, the roof 1 is a substantially rectangular glazed roof, the glazing extending over the entire surface of the roof. The panel of the roof consists of this glazing. The glazing comprises a transparent glazed part 2 surrounded by an opaque glazed part (or concealing part) 7. The opaque glazed part 7 can for example comprise an opaque coating, intended for concealing the various attachment elements that it may comprise. Four loudspeakers 3 configured to generate medium and high frequencies are placed on the opaque glazed part 7 of the roof 1, in a peripheral zone adjacent to the lateral edges 10 of the roof (two in the vicinity of one lateral edge 10, and two others in the vicinity of the other lateral edge 10). In the configuration shown, each loudspeaker 3 in the vicinity of a lateral edge 10 faces one loudspeaker 3 in the vicinity of the other lateral edge 10. An actuator configured to generate low frequencies 4 is positioned at the rear of the roof, that is, in a peripheral zone adjacent to the rear edge 9 of the roof; and a tweeter loudspeaker (that is, a loudspeaker configured to generate high frequencies) 5 is positioned at the front of the roof, that is, in a peripheral zone adjacent to the front edge 8 of the roof. FIG. 4 shows a cross-section of a glazing 200 that could be used as the glazing of FIG. 1. The glazing 200 includes a laminated glass sheet comprising at least two glass sheets 201, 202 between which at least one interlayer film 203 is inserted. FIG. 2 schematically shows a vehicle 100 that is a motor vehicle. FIG. 3 schematically shows a top view of the vehicle 100. FIG. 3 shows that the vehicle 100 includes a front windshield 101 and a rear window 102 that each comprise an actuator 4. The front windshield 101 also comprises a loudspeaker 3. The vehicle 100 also includes a pillar 103 that includes the audio device 3, 4. FIG. 2 also shows a door 104 of the vehicle 100 that includes an audio device 3. Moreover, the vehicle 100 further includes a dashboard 105 that includes the audio device 3, 4.

By way of example, the loudspeakers 3 are parallelepipedal in shape and have a length of 100 mm, a width of 45 mm and a depth of 20.5 mm. The actuator configured to generate low frequencies 4 is cylindrical in shape and has a diameter of 53 mm and a depth of 17.3 mm and the tweeter 5 is parallelepipedal in shape and has a length of 57.5 mm, a width of 23 mm and a depth of 14.85 mm.

The loudspeakers and actuators located in the roof are thus placed directly above the seats of the vehicle and the head of the passengers, allowing a short and direct sound path to the passengers' ears, which provides high-fidelity performance and 3D sound reproduction capabilities to the audio system.

Vehicle

The invention also relates to a vehicle comprising a roof as disclosed herein before.

The vehicle can be as defined herein before. In particular, the vehicle is a motor vehicle.

The vehicle comprises a passenger compartment delimited by the roof.

The vehicle can also comprise at least one door. In the French text of the present invention, the terms "portière" and "porte" are both used with the same meaning ("door"). The vehicle according to the invention can also comprise a front windshield and/or a rear window. The front windshield can have a quadrilateral shape (in particular rectangular or substantially rectangular, or trapezoidal or substantially trapezoidal), in particular with an upper edge (that is, on the side of the top of the vehicle), a lower edge (that is, on the side of the vehicle) and two lateral edges. The vehicle may comprise at least one pillar. "Pillar" is understood to mean a part of the vehicle located between two doors and/or glazed surfaces.

In the present invention, the loudspeakers and/or the actuators of the roof are located in the passenger compartment of the vehicle, that is, they are positioned on the side of the roof facing towards the passenger compartment of the vehicle. Thus, the outer surface of the diaphragms of the loudspeakers is oriented towards the inside of the passenger compartment. Preferably, the outer surface of the diaphragm is in contact with the air of the passenger compartment of the vehicle. The actuators are also in contact with the air of the passenger compartment of the vehicle.

Advantageously, the roof of the vehicle comprises at least two audio devices selected from the loudspeakers and the actuators, these being positioned in the roof so as to create stereophonic sound for the passengers.

The vehicle may comprise at least one actuator configured to generate low frequencies located in the front windshield, preferably in the bottom part of the windshield and/or (when the windshield comprises a rearview mirror) near the mountings of the rearview mirror of the front windshield, and/or in the rear window, preferably on the edges of the rear window. The bottom part of the front windshield can consist of a part of the windshield adjacent to the lower edge of the windshield and with a width (that is, in a direction orthogonal to the lower edge of the windshield, in the plane of the windshield) less than or equal to 30 cm. "Near the mountings of the rearview mirror" is understood to mean located in a circular zone of the windshield with a radius of less than or equal to 15 cm, the center of which is formed by the mountings of the rearview mirror. "On the edges of the rear window" is understood to mean that the audio device is adjacent to an edge of the rear window. At the locations disclosed herein before, a relatively large surface is available for the vibration, which can improve the emission of low frequencies. These embodiments are however less preferred since the windshield and/or the rear window may contain other elements, such as mirrors, cameras, rain sensors, etc., which can induce vibrations that might alter the performance of the actuator. The actuator can then comprise a stabilizing structure to eliminate these vibrations. These embodiments can be an alternative or an addition to the presence of an actuator configured to generate low frequencies in the roof of the vehicle.

The vehicle may comprise at least one tweeter located in the front windshield, preferably in the bottom part of the windshield, more preferably in the bottom part and in one or both lateral zones of the front windshield. In a particularly preferred way, the audio system comprises at least two tweeters located in the bottom part of the windshield in the two lateral zones (that is, on the left and on the right) of the front windshield, at least one tweeter being located in a lateral zone of the windshield and at least one other tweeter being located in the other lateral zone. The lateral zone of the windshield can consist of a zone adjacent to a lateral edge of the windshield and with a width (that is, in a direction orthogonal to the lateral edge of the windshield, in the plane of the windshield) less than or equal to 50 cm. These embodiments can be an alternative or an addition to the presence of a tweeter in the roof of the vehicle.

The vehicle according to the invention can also comprise at least one loudspeaker and/or actuator positioned in at least one pillar of the vehicle. This can be a loudspeaker and/or an actuator as disclosed herein before.

The vehicle according to the invention can also comprise at least one loudspeaker and/or actuator positioned in at least one door of the vehicle. This can be a loudspeaker and/or an actuator as disclosed herein before.

The vehicle according to the invention can also comprise at least one loudspeaker and/or actuator positioned in the dashboard of the vehicle. This can be a loudspeaker and/or an actuator as disclosed herein before.

The vehicle according to the invention can also comprise at least one loudspeaker and/or actuator positioned in the front windshield and/or in the rear window. This loudspeaker and/or actuator can be located, in particular if it is an actuator, in the bottom part of the front windshield and/or (when the windshield comprises a rearview mirror) near the mountings of the rearview mirror of the front windshield, and/or on the edges of the rear window. Alternatively or additionally, it can be located, in particular if it is a loudspeaker, in the bottom part and in one lateral zone or in both lateral zones (that is, on the left and on the right) of the front windshield; preferably at least one loudspeaker is located in one lateral zone of the windshield and at least one second loudspeaker is located in the other lateral zone of the windshield. The at least one loudspeaker and/or actuator positioned in the front windshield and/or in the rear window can be a loudspeaker and/or an actuator as disclosed herein before.

In other variants, the doors of the vehicle do not comprise an audio device selected from the loudspeakers and the actuators.

The vehicle may not comprise an audio device selected from the loudspeakers and the actuators in the pillars and/or in the dashboard and/or in the front windshield and/or in the rear window.

In some embodiments, the vehicle comprises a total number of loudspeakers and/or actuators ranging from 1 to 20, preferably from 2 to 20, more preferably from 3 to 20, even more preferably from 6 to 15. For example, the total number of loudspeakers and/or actuators of the vehicle can be 1 to 2, or 2 to 3, or 3 to 4, or 4 to 5, or 5 to 6, or 6 to 7, or 7 to 8, or 8 to 9, or 9 to 10, or 10 to 11, or 11 to 12, or 12 to 13, or 13 to 14, or 14 to 15, or 15 to 16, or 16 to 17, or 17 to 18, or 18 to 19, or 19 to 20.

The loudspeakers and/or actuators of the vehicle can be part of an audio system which can also comprise a digital audio controller (DAS) board with multiple channels and/or one or more amplifiers. These can be as they are in conventional vehicle audio systems, or can be located in the trunk of the vehicle.

The invention claimed is:

1. A roof of a vehicle, comprising:
   a panel, and
   a plurality of audio devices, each audio device of the plurality of audio devices being either a loudspeaker or an actuator, the actuator being located on the panel, the panel being a glazing and capable of vibrating, wherein the panel has a quadrilateral shape with a first edge, a second edge, a third edge and a fourth edge, which are consecutive, the plurality of audio devices comprising:
- a first audio device positioned on the panel, in a peripheral first zone adjacent to the first edge of the panel, said first zone having a width along a direction orthogonal to the first edge less than or equal to 50 cm, and
- a second audio device positioned on the panel, in a peripheral second zone adjacent to the third edge of the panel, said second zone having a width along a direction orthogonal to the third edge less than or equal to 50 cm, and wherein the roof further comprises at least one actuator that, when actuated, generates low frequencies, the at least one actuator being located on the panel, in a peripheral third zone adjacent to the second edge of the panel, said third zone having a width along a direction orthogonal to the second edge less than or equal to 50 cm.

2. The roof according to claim 1, wherein at least one of the first and second audio devices is configured to generate high and/or medium frequencies.

3. The roof according to claim 1, wherein the plurality of audio devices comprise at least one loudspeaker or actuator configured to generate high frequencies.

4. The roof according to claim 1, wherein the plurality of audio devices comprise
- a loudspeaker or an actuator configured to generate high frequencies positioned on the panel, in a peripheral zone adjacent to the fourth edge of the panel.

5. The roof according to claim 1, wherein the glazing comprises a glass sheet.

6. The roof according to claim 5, wherein the glass sheet is made of organic or mineral glass.

7. The roof according to claim 1, wherein the glazing comprises a laminated glass sheet comprising at least two glass sheets between which at least one interlayer film of viscoelastic plastic nature is inserted, the interlayer filmbeing made of polyvinyl butyral or ethylene-vinyl acetate copolymer.

8. The roof according to claim 1, comprising a total number of loudspeakers and actuators ranging from 1 to 20.

9. The roof according to claim 1, wherein a surface that is vibrated by the at least one actuator, which, when actuated, generates low frequencies, comprises the glazing.

10. A vehicle comprising a roof, said roof including:
a panel, and
a plurality of audio devices, each audio device of the plurality of audio devices being either a loudspeaker or an actuator, the actuator being located on the panel, the panel being a glazing and capable of vibrating,
wherein the panel has a quadrilateral shape with a first edge, a second edge, a third edge and a fourth edge, which are consecutive, the plurality of audio devices comprising:
- a first audio device positioned on the panel, in a peripheral first zone adjacent to the first edge of the panel, said first zone having a width along a direction orthogonal to the first edge less than or equal to 50 cm, and
- a second audio device positioned on the panel, in a peripheral second zone adjacent to the third edge of the panel, said second zone having a width along a direction orthogonal to the third edge less than or equal to 50 cm, and wherein the roof further includes at least one actuator that, when actuated, generates low frequencies, the at least one actuator being located on the panel, in a peripheral third zone adjacent to the second edge of the panel, said third zone having a width along a direction orthogonal to the second edge less than or equal to 50 cm.

11. The vehicle according to claim 10, comprising a front windshield and/or a rear window and comprising at least one actuator configured to generate low frequencies positioned in the front windshield and/or in the rear window.

12. The vehicle according to claim 10, comprising a front windshield and comprising at least one loudspeaker or actuator configured to generate high frequencies positioned in the front windshield.

13. The vehicle according to claim 10, comprising at least one pillar, and comprising at least one audio device selected from the loudspeakers and the actuators located in the at least one pillar.

14. The vehicle according to claim 10, comprising at least one door and/or a dashboard and/or a front windshield and/or a rear window, and comprising at least one audio device selected from the loudspeakers and the actuators positioned in the at least one door and/or in the dashboard and/or in the front windshield and/or in the rear window.

15. The vehicle according to claim 10, which is a motor vehicle.

16. The vehicle according to claim 10, wherein a surface that is vibrated by the at least one actuator, which, when actuated, generates low frequencies, comprises the glazing.

* * * * *